Jan. 10, 1933.   E. A. JOHNSTON   1,894,099
TAPERED ROLLER BEARING
Filed Feb. 1, 1928   2 Sheets-Sheet 1
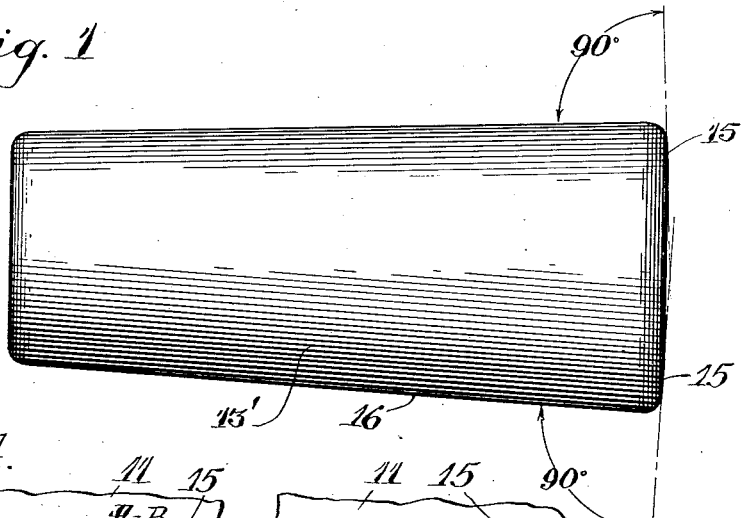
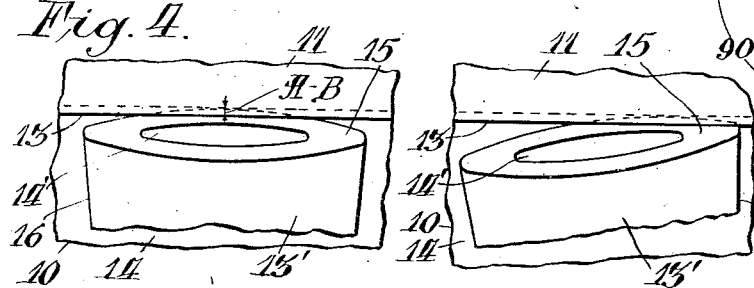
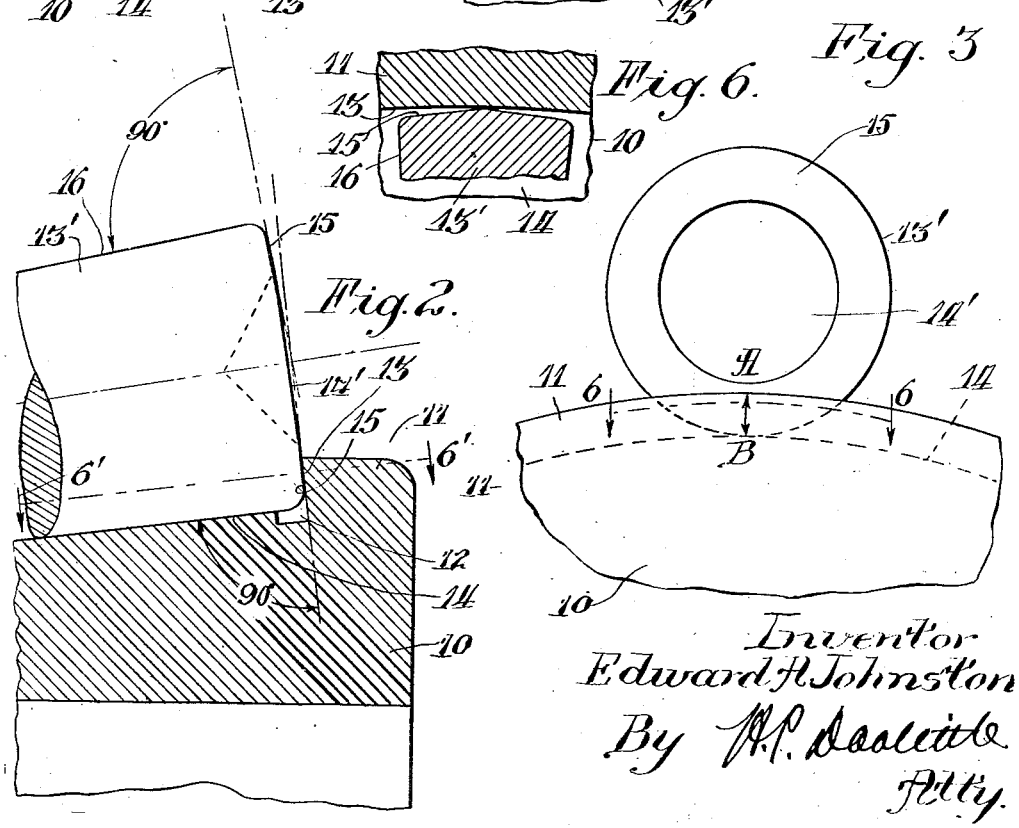
Inventor
Edward A. Johnston
By H. C. Doolittle
Atty.

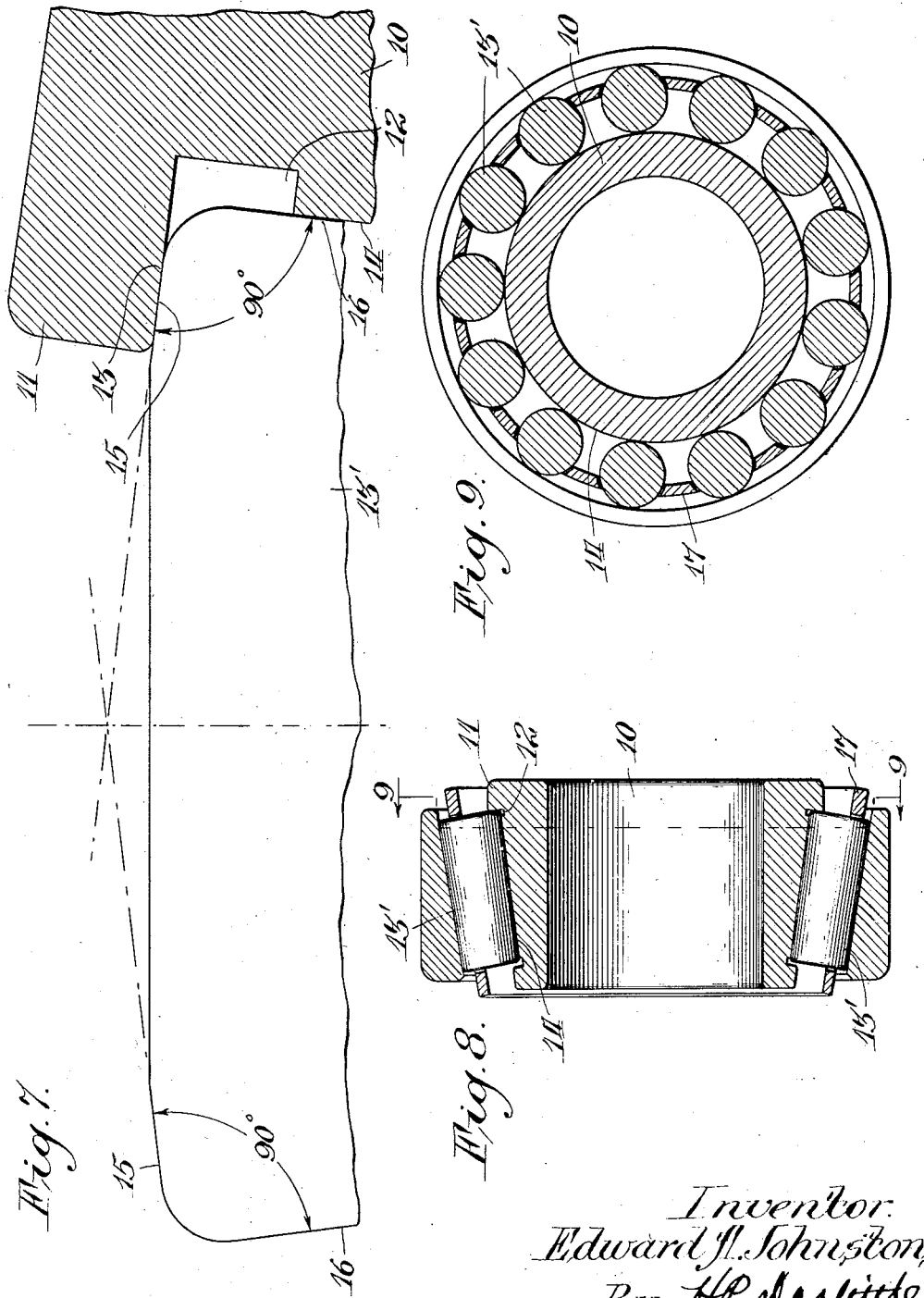

Patented Jan. 10, 1933

1,894,099

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

TAPERED ROLLER BEARING

Application filed February 1, 1928. Serial No. 250,976.

This invention is in the roller bearing art, and relates to an improved construction of tapered bearing designed to take both end and radial thrust loads.

Tapered roller bearings as known in this art comprise an inner race formed with a thrust flange, an outer race, and a circular series of tapered or conical rollers movable between the races, the flange mentioned serving to prevent the rollers from running off the inner race when under load, and to take the end thrust of the rollers. Such rollers may be arranged in spaced relationship by means of a retaining cage having slots to receive the rollers.

In these bearings it is important to maintain the sides of the roller parallel with the sides of the race-way in order to preserve the full anti-frictional function of the rollers. Should the rollers skew off from this correct relation of parallelism, friction will result not only between the race-way of the cone and the surface of the body of the roller, but also between the ends of the rollers and the thrust flange.

There have been two classes of taper roller bearings having constructions designed to prevent this relative disalignment of the rollers and cone.

In the first class the rollers have been held closely within the slots or recesses of the retaining cage against lateral displacement or tilting. In the second class of constructions the rollers have been held loosely within the slots or recesses of the retaining cage and the preservation of alignment obtained by a relative construction of the end of the roller and the flange which obtains a self-righting action should the roller skew off. The first class of constructions tends to produce a sliding action between the end of the roller and the thrust flange which clearly increases the friction between these parts.

In this construction, also, since the cages are necessarily made of comparatively soft metal, considerable wear of the cage is produced due to the friction between the rollers and cage. As a result the cage wears out quickly and loses its capacity for retaining and guiding the rollers in their correct position of alignment with respect to the surface of the cone. There also exists the possibility of damage due to small particles worn off from the cage causing clogging of the bearing. Hence, in actual use, the cage guiding type of bearing is subject to substantially the same friction at the thrust rib as the self-righting type of bearing. For the above reasons the first class of taper rollers has been generally displaced in use by rollers of the self-righting class.

Taper rollers of this latter class as generally used have depended upon either a single point of contact between the end of the roller and the thrust flange or upon a contact at two points spaced apart on either side of a radial line across the upper end of the roller. In rollers of this construction there is a tendency to deformation of the roller in the thrust flange under imposition of sudden extreme loads or under extreme wear such as may result in the impairment of the functioning of the bearing as intended by its original construction.

The object of this invention is to provide in the general class of taper roller bearings a bearing in which more effective end thrust resisting contact between the roller and the thrust flange of the race member shall be provided so as to enable greater loads to be maintained and to prevent such change in the form of the rollers due to wear as will produce endwise play of the rollers and particularly to provide a bearing having a self-righting action with comparatively slight frictional end contact, and in which such deformation of the roller and thrust flange under imposition of sudden extreme loads or under extreme wear as to destroy the original functional characteristics of the rollers is prevented or reduced to a minimum, and whereby any change in the form of the contacting surfaces as may possibly result from such extreme loads or extreme wear tends to increase the self-righting action of the rollers.

Briefly, and in preferable form, the invention comprises a tapered roller bearing having rollers of the self-righting construction in which the angle between the thrust flange or rib of the cone and the main bearing surface of the cone shall be the same as the angle between the thrust surface at the large end of the roller and the main bearing surface of the roller, whereby there will be produced under normal conditions a true line contact between the end of the roller and thrust flange or rib of the cone, while at the same time the self-righting action of the rollers within the loosely engaging sockets or recesses of the retaining cage will be effectively preserved. Preferably, this angle will be exactly one of ninety degrees.

The invention is embodied in preferable form in the construction hereinafter described and illustrated in the accompanying drawings in which:

Figure 1 is an enlarged side elevational view of the improved tapered roller of this invention;

Figure 2 is a fragmentary side elevation partly in section showing the tapered roller and inner race or cone piece;

Figure 3 is an end elevation of the part shown in Figure 2;

Figure 4 is a detailed side elevational view showing the roller in normal position in the bearing;

Figure 5 is a view similar to Figure 4 but showing to an exaggerated degree a roller in tilted or angular position such as may result when the roller "skews" off from its normal position;

Figure 6 is a cross section on the line 6—6 of Figure 3 and also on line 6'—6' of Figure 2, looking down in the direction of the arrows as indicated and showing the line contact between the end of the roller and the thrust flange;

Figure 7 is an enlarged side view of the roller and a part of the inner race member;

Figure 8 is a vertical section showing an assembled bearing; and

Figure 9 is a cross section on the line 9—9 of Figure 8.

The inner race member or cone 10 is tapered and is provided at its larger end with a thrust flange or rib 11. The usual grinding relief groove 12 is shown in this race member. The thrust face 13 of this flange is formed at an exact right angle with respect to the race-way 14 of the inner race piece 10 as indicated in Figure 2. This ninety degree angle is designated by the semi-circle and arrow between the race-way surface and a projected line from the contact face of the thrust flange.

Each roller, one of which is shown by the character 13', is tapered or frusto-conical in shape, its larger end having a conical recess 14' formed to receive the center of a suitable grinding machine.

Extending from the edge of this opening outwardly is an annular thrust surface 15, the plane of which surface is disposed at an exact right angle to the main cylindrical bearing surface 16 of the roller as shown in Figures 1, 2 and 7. The smaller end of the rollers may be flat as shown in Figure 1 so that a plane passing therethrough will be normal, that is, at right angles to the axis of the roller. With a roller thus constructed and in place on the race-way of the race member 10, it will be seen that the thrust surface 15 as illustrated in Figures 2, 3, 4, 5, 6 and 7 will abut with a line contact against the thrust flange along the line A—B.

Such a line extends from the outer edge of the center receiving recess to the outer edge of the bearing surface of the roller. With a bearing so constructed it will be seen that the pressure of the roller end against the thrust flange of the race member will be distributed uniformly along the line A—B and that, therefore, any tendency to skewing action of the roller will be resisted by the elongated contact with the rib, and that the angle of thrust is such as to most effectively sustain loads and prevent such wear between the roller and its contacting parts as may produce end play. Such uniformly distributed contact also tends to prevent such deformation of the contacting surfaces as would destroy or alter the original functions of the line contact.

In the event of the imposition of such sudden extreme loads or of such extreme wear as to destroy true line contact, the resulting condition produced would be a contact surface extending on both sides of the original contact line which, while increasing frictional resistance slightly, would tend to increase the self-righting or self-maintaining action of the roller.

In Figures 8 and 9 an assembled roller is indicated. The rollers are shown as held in slots in the usual conical retaining cage 17. They are held loosely in these slots so as to be capable of slight individual freedom of movement, the correct axial alignment of the rollers being preserved by the self-righting construction described herein.

What is claimed as new is:

1. In a tapered roller bearing, the combination of a tapered inner race member having a race-way surface and a fixed thrust flange provided with a thrust surface disposed at an angle of ninety degrees with respect to the race-way surface on the race member, and a tapered roller cooperating with said race piece and having a thrust surface at its larger end disposed at a ninety degree angle with respect to the tapered surface of the roller.

2. In a tapered roller bearing, the combination of a tapered inner race member having a race-way surface and a fixed thrust flange provided with a thrust surface disposed at an angle of ninety degrees with respect to the race-way surface on the race member, and a tapered roller cooperating with said race piece and having an annular thrust surface disposed at an angle of ninety degrees with respect to the main tapered bearing surface of the roller.

3. In a tapered roller bearing, the combination with a tapered race member having a race-way surface and a fixed thrust flange provided with a thrust surface disposed at an angle of ninety degrees with respect to the race-way surface on said member, of a tapered roller and retaining means for the roller permitting slight freedom of movement of the roller therein to permit maintenance or restoration of correct alignment of the roller independently of said retaining means, said roller having at its large end a thrust surface adapted to contact against the thrust flange and disposed at an angle of ninety degrees with respect to the main tapered bearing surface of the roller.

4. In a tapered roller bearing, the combination with a tapered race member having a race-way surface and a fixed thrust flange the latter being at an angle of ninety degrees to said surface, of a tapered roller and retainng means for the roller permitting slight freedom of movement of the roller therein to permit maintenance or restoration of correct alignment of the roller independently of said retaining means, the bearing surface of the large end of the roller lying in a cone the surface of which is parallel to the contact surface of said thrust flange and which contact cone surface of the roller is at an angle of ninety degrees to the said tapered surface of the roller.

In testimony whereof I affix my signature.

EDWARD A. JOHNSTON.